US011659085B1

(12) United States Patent
Serrao et al.

(10) Patent No.: US 11,659,085 B1
(45) Date of Patent: May 23, 2023

(54) GENERATIVE VOICE FOR AUTOMATED BOT HANDOFF TO CUSTOMER SERVICE REPRESENTATIVE

(71) Applicant: UIPCO, LLC, San Antonio, TX (US)

(72) Inventors: Nolan Serrao, Plano, TX (US); Ravi Durairaj, San Antonio, TX (US); Ruthie D. Lyle, Durham, NC (US); Sean Carl Mitchem, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 8 days.

(21) Appl. No.: 17/356,927

(22) Filed: Jun. 24, 2021

Related U.S. Application Data

(60) Provisional application No. 63/046,104, filed on Jun. 30, 2020.

(51) Int. Cl.
*H04M 3/493* (2006.01)
*H04M 3/51* (2006.01)
*H04M 3/523* (2006.01)

(52) U.S. Cl.
CPC ......... *H04M 3/493* (2013.01); *H04M 3/5175* (2013.01); *H04M 3/5183* (2013.01); *H04M 3/5237* (2013.01)

(58) Field of Classification Search
None
See application file for complete search history.

(56) References Cited

U.S. PATENT DOCUMENTS

| 2018/0376002 | A1* | 12/2018 | Abraham | H04M 3/5183 |
| 2021/0136208 | A1* | 5/2021 | Adibi | G06N 5/022 |

* cited by examiner

*Primary Examiner* — Hemant S Patel
(74) *Attorney, Agent, or Firm* — Plumsea Law Group, LLC

(57) ABSTRACT

A system and method for applying a generative voice associated with a particular customer service representative to an automated bot that initially interacts with a customer to provide a seamless handoff between the automated bot and the particular customer service representative is described. In one embodiment, when a call from a customer is received at the customer service call center, the customer is matched with a potential customer service representative that is likely to handle the customer's call. The customer will then initially interact with an automated bot that has applied a generative voice associated with the likely customer service representative. The customer can talk with the automated bot using the generative voice and, if needed, when the call is handed off from the automated bot to the customer service representative, the customer will not notice a change in voice or other discontinuity on the call.

20 Claims, 7 Drawing Sheets

GENERATIVE VOICE FOR AUTOMATED BOT HANDOFF TO CUSTOMER SERVICE REPRESENTATIVE

This application claims the benefit of U.S. Provisional Patent Application Ser. No. 63/046,104 filed on Jun. 30, 2020 and titled "Generative Voice for Automated Bot Handoff to Customer Service Representative", the disclosure of which is incorporated by reference in its entirety.

TECHNICAL FIELD

The present disclosure generally relates to automated customer service for a service provider, and in particular, to applying a generative voice associated with a customer service representative to an automated bot to interact with a customer calling a customer service call center.

BACKGROUND

When customers have an issue or problem with a service provider or other business, they are often directed to a call center where their issue can be addressed by customer service representatives. Typically, when a customer contacts the call center, they initially interact with an automated menu or bot that goes through various prompts, requests information regarding the nature of the call, provides some limited self-service options, and can route the customer's call to a live customer service representative, if needed, to handle the customer's issue. This interaction between the customer and the automated menu or bot is not a free-flowing conversation, as there is a distinct handoff with a change in voice between the automated menu and the live customer service representative that may eventually service the call.

This noticeable discontinuity between the automated menu voice and the voice of the live customer service representative can leave customers calling into the call center feeling frustrated with having to deal with multiple layers of customer service before reaching the live customer service representative that can provide the help that is needed to address their issue or problem.

There is a need in the art for a system and method that addresses the shortcomings discussed above.

SUMMARY

In one aspect, a method of applying a generative voice to an automated bot at a call center is provided. The method includes receiving an incoming call from a customer at the call center. The method also includes applying a generative voice to the automated bot using a stored voiceprint of a particular customer service representative from a plurality of stored voiceprints. The method further includes interacting with the customer, by the automated bot, using the generative voice so as to mimic a voice of the particular customer service representative.

In another aspect, a system for applying a generative voice to an automated bot at a call center is provided. The system includes a computer system at a call center. The computer system includes at least one processor associated with a computing device and at least one database. The call center is in communication with one or more customers through a network. The at least one processor is configured to receive an incoming call from a customer at the call center and apply a generative voice to the automated bot using a stored voiceprint of a particular customer service represen- tative from a plurality of stored voiceprints. The at least one processor is further configured to interact with the customer, by the automated bot, using the generative voice so as to mimic a voice of the particular customer service representative.

In another aspect, a method of eliminating a voice discontinuity during a handoff from an automated bot to a customer service representative at a call center is provided. The method includes receiving an incoming call at the call center from a customer. The method also includes determining a particular customer service representative likely to be available to assist the customer. The method further includes applying a generative voice to an automated bot that initially interacts with the customer. The generative voice is applied using a stored voiceprint of the particular customer service representative from a plurality of stored voiceprints. The method includes interacting with the customer, by the automated bot, using the generative voice of the particular customer service representative. Upon determining that a live customer service representative is needed to assist the customer, the method includes handing off the call from the automated bot to the particular customer service representative whose stored voiceprint was used for the generative voice of the automated bot.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments described herein provide a system and method for applying a generative voice associated with a particular customer service representative to an automated bot that initially interacts with a customer to provide a seamless handoff between the automated bot and the particular customer service representative. According to the example embodiments, when a call from a customer is received at the customer service call center, the customer is matched with a potential customer service representative that is likely to handle the customer's call. The customer will then initially interact with an automated bot that has applied a generative voice associated with the likely customer service representative. In general, a generative voice is a subset of general adversarial networks (GANs) which uses two competing convolutional neural networks in order to generate new synthetic instances of data (i.e., a voice) that can be passed on as new data. The customer can talk with the automated bot using the generative voice and, if needed, when the call is handed off from the automated bot to the customer service representative, the customer will not notice a change in voice or other discontinuity on the call. With this arrangement, the techniques of the example embodiments provide a seamless transition between an automated bot and a live customer service representative and an improved customer service experience for the customer.

Figure 1:
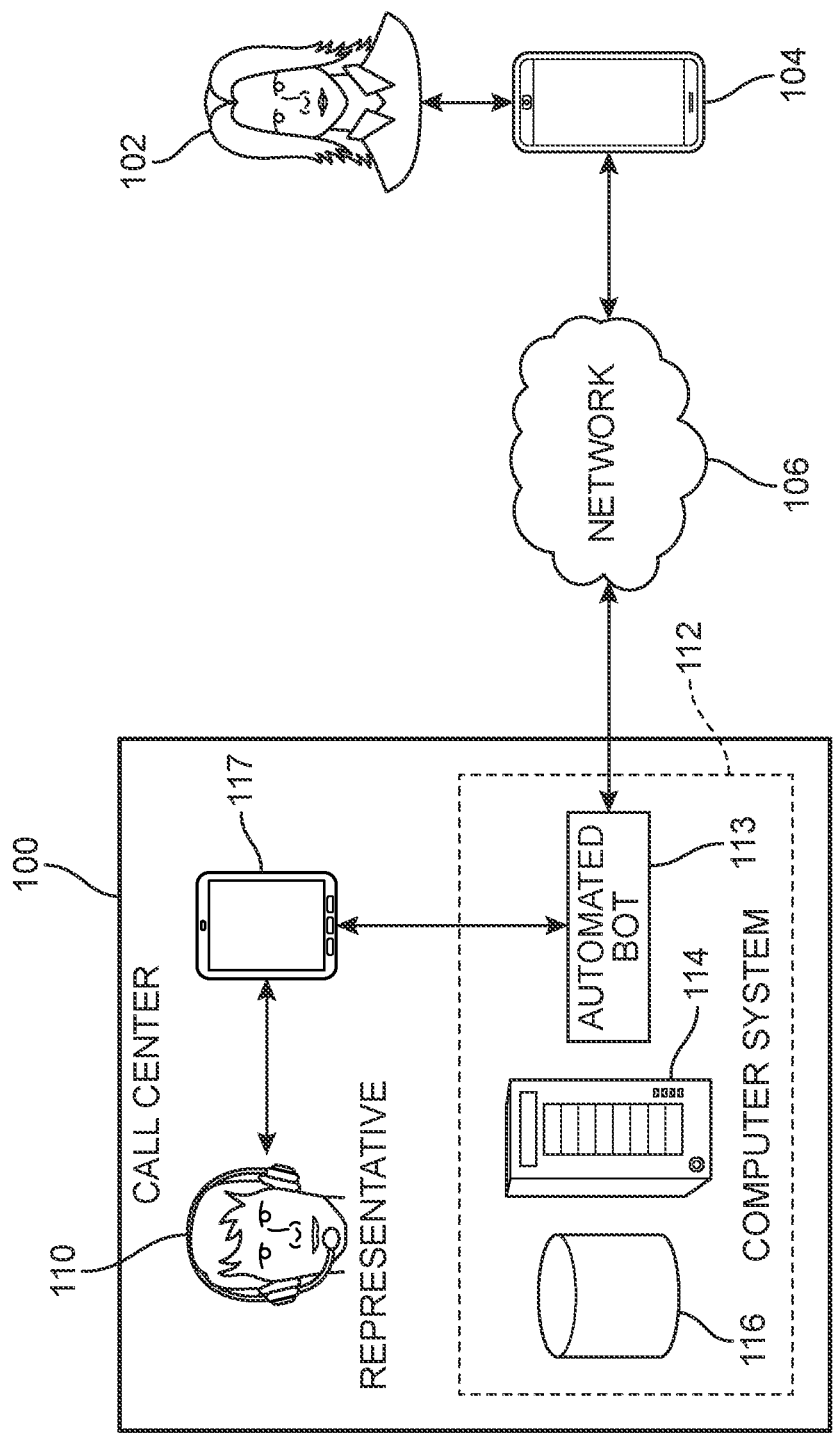
FIG. 1 is a schematic view of a system for applying a generative voice to an automated bot at a customer service call center, according to an example embodiment.

Referring now to FIG. 1, an example embodiment including some of the systems, components and devices that may be used to facilitate interactions between a customer service call center 100 for a service provider and a user or customer 102 of the customer service system. In some embodiments, call center 100 may provide customer service for any type of service provider, which may be a company or any other organization that provides services to users. For example, in one embodiment, the service provider could be a bank. In another embodiment, the service provider could be an insurance company. In another embodiment, the service provider could be a company that provides banking services and insurance services as well as other kinds of services. User 102 could be a customer, member, client, consumer, or any other user of services provided by the service provider.

To facilitate interactions with customers, members or general users of its services, customer service call center 100 for the service provider includes a plurality of service representatives, including at least one service representative 110 shown in FIG. 1. As used herein, the term "customer service representative" (or simply, "representative") refers to any individual operating in a capacity to represent a service provider in interactions with a customer or user. The representative could be, for example, an employee at call center 100 or a contractor or other person acting on behalf of call center 100 for the service provider. Additionally, representatives may be physically present at call center 100 and/or may be located remotely from call center 100 and have calls routed through a computer system at call center 100 to connect customers with the representative.

A representative could operate within a larger customer service system (or department) of the service provider. For example, a bank could provide a customer service system that allows users to speak with representatives to help them obtain their account balances, pay bills, apply for and/or discuss loans, transfer money between accounts, wire money, get access to online services, troubleshoot technical problems associated with the bank's website, ask questions about forms and documents, as well as to help with any other suitable needs a user (or customer) might have. As another example, an insurance company could provide a customer service system that allows users to speak with representatives to help them with insurance policies and claims, as well as to help with any other suitable needs a user (or customer) might have.

In an example embodiment, customer service call center 100 includes at least one computer system 112. The term "computer system" refers to the computing resources of a single computer, the partial computing resources of a single computer, a plurality of computers communicating with one another, or a network of remote servers. In one embodiment, computer system 112 includes at least one server having at least one processor.

In the embodiment of FIG. 1, computer system 112 includes one or more computing devices 114 (for example, a server) that may be in communication with one or more databases 116. Databases 116 could be co-located with computing devices 114 or could be remote databases that are accessible by computing devices 114 over a network. Databases 116 can include any kind of storage devices, including but not limited magnetic, optical, magneto-optical, and/or memory, including volatile memory and non-volatile memory. In an example embodiment, computer system 112 may also include at least one automated bot 113. Automated bot 113 may be an artificial intelligence (AI) or other algorithm configured to autonomously interact with and provide assistance to one or more customers, including user 102. In some embodiments, automated bot 113 may be implemented in software, hardware, or a combination thereof. For example, in one embodiment, automated bot 113 may be an AI or other algorithm implemented by at least one processor associated with computer system 112, such as a processor or processors of computing devices 114.

In some embodiments, representative 110 may have access to a device of computer system 112. In one embodiment, representative 110 may have access to a representative device 117. In FIG. 1, representative device 117 is depicted as a mobile computing device, such as a smartphone or tablet computer. In other embodiments, representative device 117 could be a desktop computer, a laptop computer or any other kind of computing device. Using representative device 117, representative 110 may be able to review customer records, send documents and forms to a customer, and/or perform other tasks required to help a customer calling in to call center 100.

In some embodiments, customer or user 102 may have access to a user device 104. In one embodiment, user device 104 is a mobile device, for example, a smartphone or a tablet computer. In other embodiments, however, user device 104 could include a telephone (e.g., landline and/or cellular), a tablet, a laptop, a desktop computer, or similar kind of device that allows user 102 to contact call center 100.

In some embodiments, both representative device 117 and user device 104 may be computer systems for processing and communicating information. Each device may generally include a processor, a data storage component, and a display. Each device may also include components to facilitate communication with external systems (for example, hardware and software components to enable communication over a network). In some cases, a device may include one or more input devices, such as a keyboard, mouse, and/or one or more physical buttons integrated into a case of the device. In other cases, a device may further include touchscreen controls and inputs.

In one embodiment, user device 104 could operate in a client-server relationship with one or more servers of computer system 112. For example, computer system 112 may include a server that communicates with user device 104 as well as other remote devices (e.g., user devices of other customers) over a network 106. User device 104 may provide the front-end of a system that provides users with options for performing various kinds of tasks (for example, making fund transfers when the company is a bank). In some cases, user device 104 may run client software through a web browser, in which case the client software may be hosted on a server associated with computer system 112. In other cases, user device 104 may run client software in the form of a native software application that has been downloaded through a centralized marketplace (i.e., an "app store"). In some cases, while the client software that allows users to perform various tasks may be run on user device 104, the data may be retrieved from and stored on databases associated with computer system 112 (e.g., databases 116).

In this embodiment, automated bot 113 of call center 100 is configured to initially receive incoming calls from one or more customers, including user 102. Automated bot 113 may listen to the customer's request for assistance and use natural language processing (NLP) and/or natural language understanding (NLU) techniques to determine the assistance requested or needed by customer calling call center 100. In some cases, automated bot 113 may resolve the customer's request or need for assistance without needing a live customer service representative to intervene or provide additional assistance. In other cases, automated bot 113 may determine that the customer's request or need for assistance cannot be handled autonomously and may handoff the call to a customer service representative (e.g., representative 110), as will be further described below.

Figure 2:
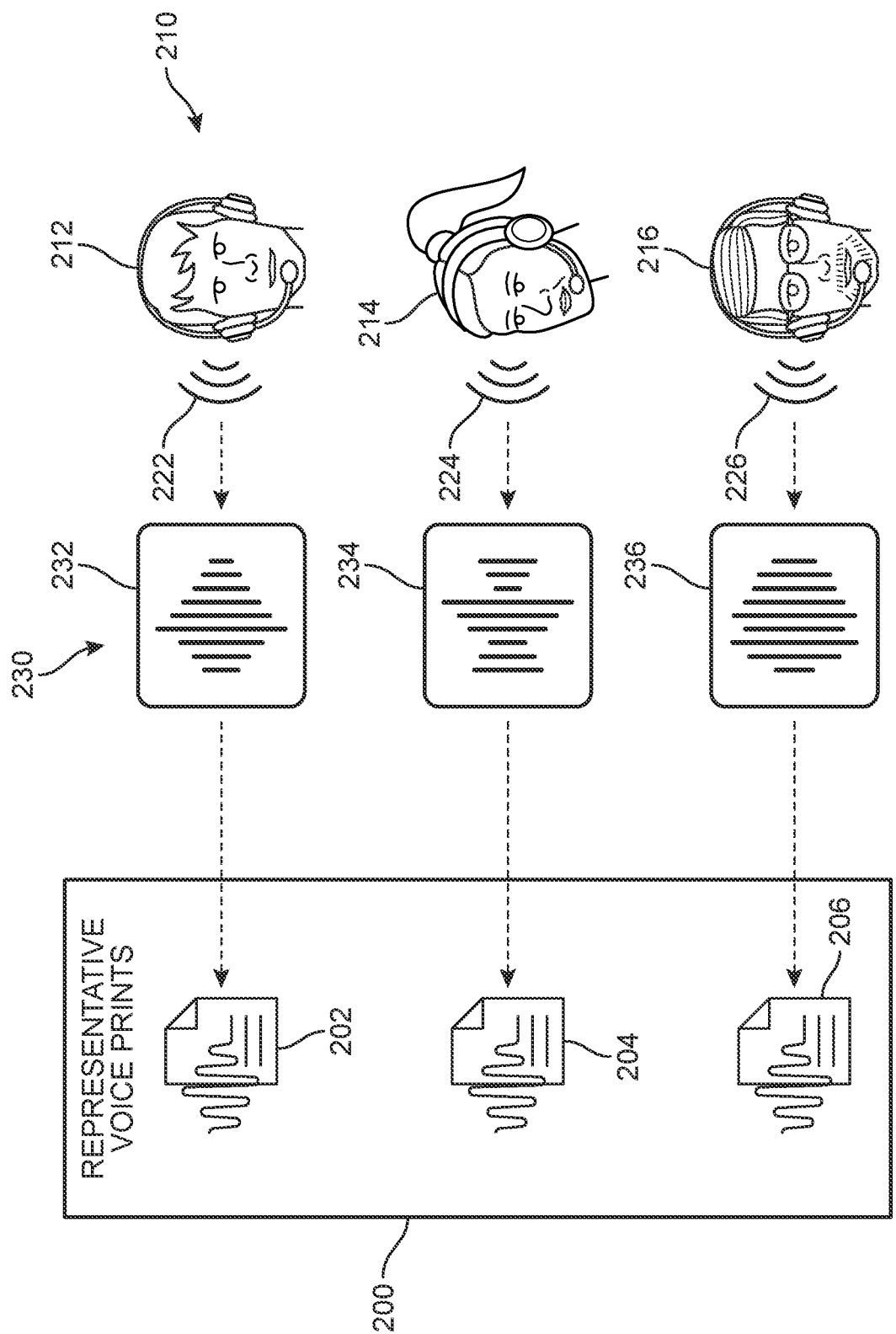
FIG. 2 is a schematic view of stored voiceprints for service representatives at a customer service call center, according to an example embodiment.

Referring now to FIG. 2, example embodiments of stored voiceprints 200 for customer service representatives are shown. In some embodiments, saved voiceprints 200 for representatives may be stored at databases 116 of computer system 112 at call center 100. In this embodiment, stored voiceprints 200 include a plurality of representative voiceprints, including at least a first stored voiceprint 202, a second stored voiceprint 204, and a third stored voiceprint 206. The plurality of representative voiceprints includes a unique, individual voiceprint for each customer service representative associated with call center 100. Accordingly, while the embodiment of FIG. 2 shows three stored voiceprints (e.g., voiceprints 202, 204, 206) included in stored voiceprints 200, it should be understood that stored voiceprints 200 may include a large number of voiceprints corresponding to the number of representatives associated with call center 100. In some cases, each representative voiceprint of the plurality of representative voiceprints included in stored voiceprints 200 may also include basic identification information associated with the representative, such as a name, employee identifier, years of experience, etc.

In an example embodiment, stored voiceprints 200 for a plurality of representatives 210 may be obtained from spoken utterances or training scripts read aloud by each representative that are then recorded, analyzed, and used to generate the corresponding voiceprint for each representative. In this embodiment, plurality of representatives 210 includes at least a first representative 212, a second representative 214, and a third representative 216. First representative 212 speaks or reads text aloud to generate a first spoken utterance 222. First spoken utterance 222 is captured, for example using a microphone or other recording device (not shown), to obtain a first voiceprint 232 associated with first representative 212. First voiceprint 232 is a unique pattern or biometric association that is specific to first representative 212 and may be used as the basis for a generative voice that imitates or mimics the voice of first representative 212 so as to sound and speak in a substantially similar manner.

In some embodiments, first representative 212 may speak or read repeatedly until a sufficient amount of characteristics of the voice of first representative 212 is obtained. For example, first representative 212 may be required to speak or read a predetermined number of sentences, words, letters, and/or combinations thereof so that first voiceprint 232 sufficiently captures the sounds and manner of speaking associated with first representative 212. Once sufficient characteristics for first voiceprint 232 of first representative 212 are obtained, the resulting voiceprint may be stored as first stored voiceprint 202 of plurality of stored voiceprints 200, for example, in database 116 of computer system 112 of call center 100, shown in FIG. 1 above.

A similar process may be used to capture spoken utterances for each of the remaining representatives of plurality of representatives 210 at call center 100 to create their stored voiceprints. For example, a second spoken utterance 224 from second representative 214 may be captured to obtain a second voiceprint 234 associated with second representative 214 which is stored as second stored voiceprint 204 of plurality of stored voiceprints 200. Additionally, a third spoken utterance 226 from third representative 216 may be captured to obtain a third voiceprint 236 associated with third representative 216 which is stored as third stored voiceprint 206 of plurality of stored voiceprints 200. This process may be repeated for each representative of plurality of representatives associated with call center 100. Together, plurality of obtained voiceprints 230 (e.g., first voiceprint 232, second voiceprint 234, and third voiceprint 236) are saved or stored in database 116 as part of plurality of stored voiceprints 200 (i.e., first stored voiceprint 202, second stored voiceprint 204, and third stored voiceprint 206). Plurality of stored voiceprints 200 will be used to create a generative voice of a corresponding representative, as will be described in further detail below.

Figure 3:
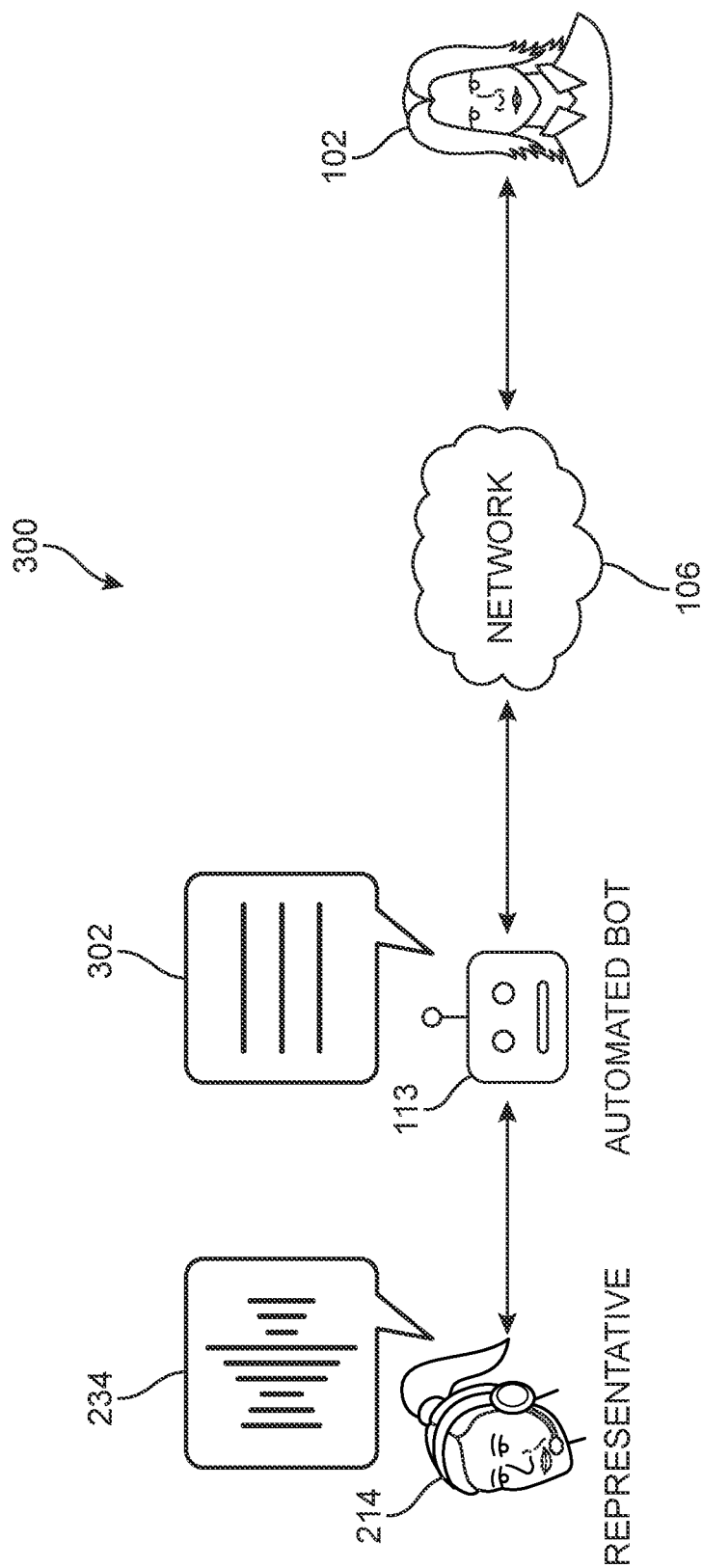
FIG. 3 is a schematic view of a process of handing off a customer from an automated bot to a customer service representative, according to an example embodiment.

Referring now to FIG. 3, an example embodiment of a process 300 of handing off a customer from an automated bot to a customer service representative is shown. In some embodiments, process 300 may begin when a customer, such as user 102, calls call center 100 about an issue or problem. User 102 is connected to call center 100 through network 106 and the call is initially handled by automated bot 113 at call center 100. As described above, automated bot 113 may be an AI or other algorithm implemented by at least one processor associated with computer system 112 of call center 100, such as a processor or processors of computing devices 114.

In this embodiment, automated bot 113 may interact with user 102 to resolve any requests, issues, or problems for which user 102 is contacting the service provider's call center 100. In an example embodiment, process 300 includes automated bot 113 using a computer-generated voice 302 to interact with user 102. For example, computer-generated voice 302 may be a generic voice that is configured to speak to user 102 to provide customer service. In the event that automated bot 113 cannot provide the needed assistance to user 102, or in other relevant circumstances, such as if automated bot 113 cannot determine the requested assistance or if user 102 asks to speak to a live representative (i.e., asking to speak "to a human"), then process 300 further includes a handoff from automated bot 113 to a live customer service representative, for example, second representative 214.

Once user 102 is connected with second representative 214, second representative 214 may then proceed to speak with user 102 to resolve the issue or request. As shown in FIG. 3, automated bot 113 interacts with user 102 using computer-generated voice 302, whereas second representative 214 speaks with user 102 using her own voice (i.e., as embodied by second voiceprint 234). Accordingly, the handoff from automated bot 113 to second representative 214 can result in an abrupt change in the voice heard and experienced by user 102. That is, the handoff from automated bot 113 to second representative 214 results in a discontinuity to user 102 caused by the change in voice during the handoff.

In some embodiments, this discontinuity from the abrupt change in voice between the automated bot and the live customer service representative may be improved by applying a generative voice of the customer service representative likely to be available to help the customer to the automated bot. With this arrangement, the initial interactions between the automated bot and the customer are conducted with the automated bot using the generative voice of the likely representative that the customer would be connected to in the event that the automated bot cannot complete the customer's request for assistance.

Figure 4:
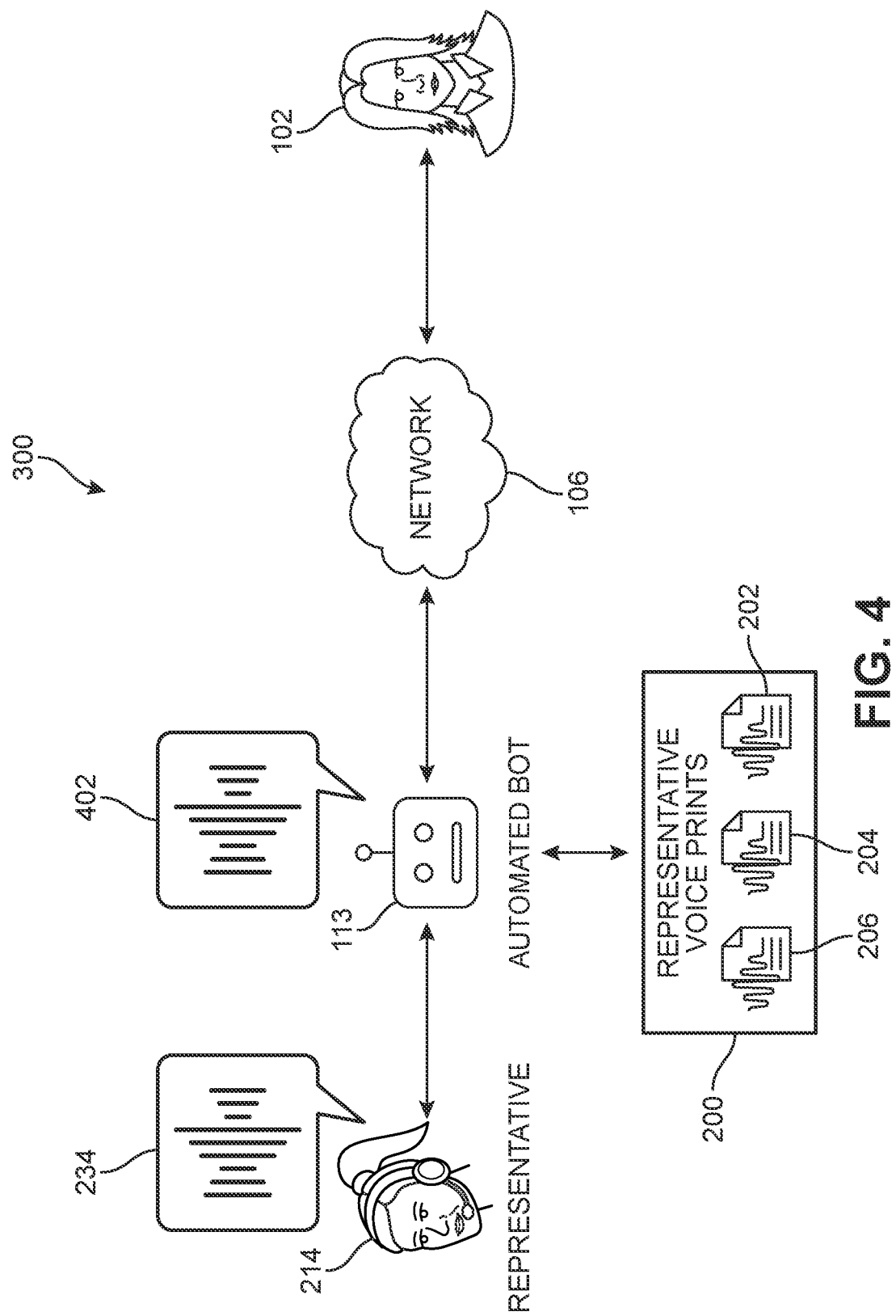
FIG. 4 is a schematic view of a process of applying a generative voice associated with a customer service representative to an automated bot, according to an example embodiment.

Referring now to FIG. 4, an example embodiment of a process 400 of applying a generative voice associated with a customer service representative to an automated bot is shown. In some embodiments, an automated bot uses an applied generative voice of a customer service representative who is likely to handle the customer's call so that the customer does not appreciably notice or experience a voice discontinuity during the handoff from the automated bot to the live customer service representative. As shown in FIG. 4, process 400 may begin when a customer, such as user 102, calls call center 100 about an issue or problem. User 102 is connected to call center 100 through network 106 and the call is initially handled by automated bot 113 at call center 100. As described above, automated bot 113 may be an AI or other algorithm implemented by at least one processor associated with computer system 112 of call center 100, such as a processor or processors of computing devices 114.

In this embodiment, automated bot 113 applies a generative voice 402 of a potential customer service representative who is likely to handle the call from user 102 in the event that the issue cannot be resolved by automated bot 113. For example, automated bot 113 may apply generative voice 402 using a voiceprint selected from plurality of stored voiceprints 200, which may be saved in database 116 of computer system 112 of call center. In this embodiment, automated bot 113 applies second stored voiceprint 204 associated with second representative 214 as the applied generative voice 402. That is, interactions between automated bot 113 and user 102 will be conducted by automated bot 113 using generative voice 402 that imitates or mimics second voiceprint 234 of second representative 214 as embodied in stored second stored voiceprint 204 of plurality of stored voiceprints 200.

According to the techniques of the example embodiments, an incoming call from a customer (e.g., user 102) to a call center (e.g., call center 100) is likely to be routed to second representative 214. As a result, generative voice 402 used by automated bot 113 for the initial interactions with user 102 are conducted using that representative's stored voiceprint (e.g., second stored voiceprint 204) so that any eventual handoff from automated bot 113 to second representative 214 will be relatively seamless from the perspective of user 102. With this arrangement, generative voice 402 used by automated bot 113 and the voice of second representative (e.g., second voiceprint 234) will sound substantially identical to user 102.

Figure 5:
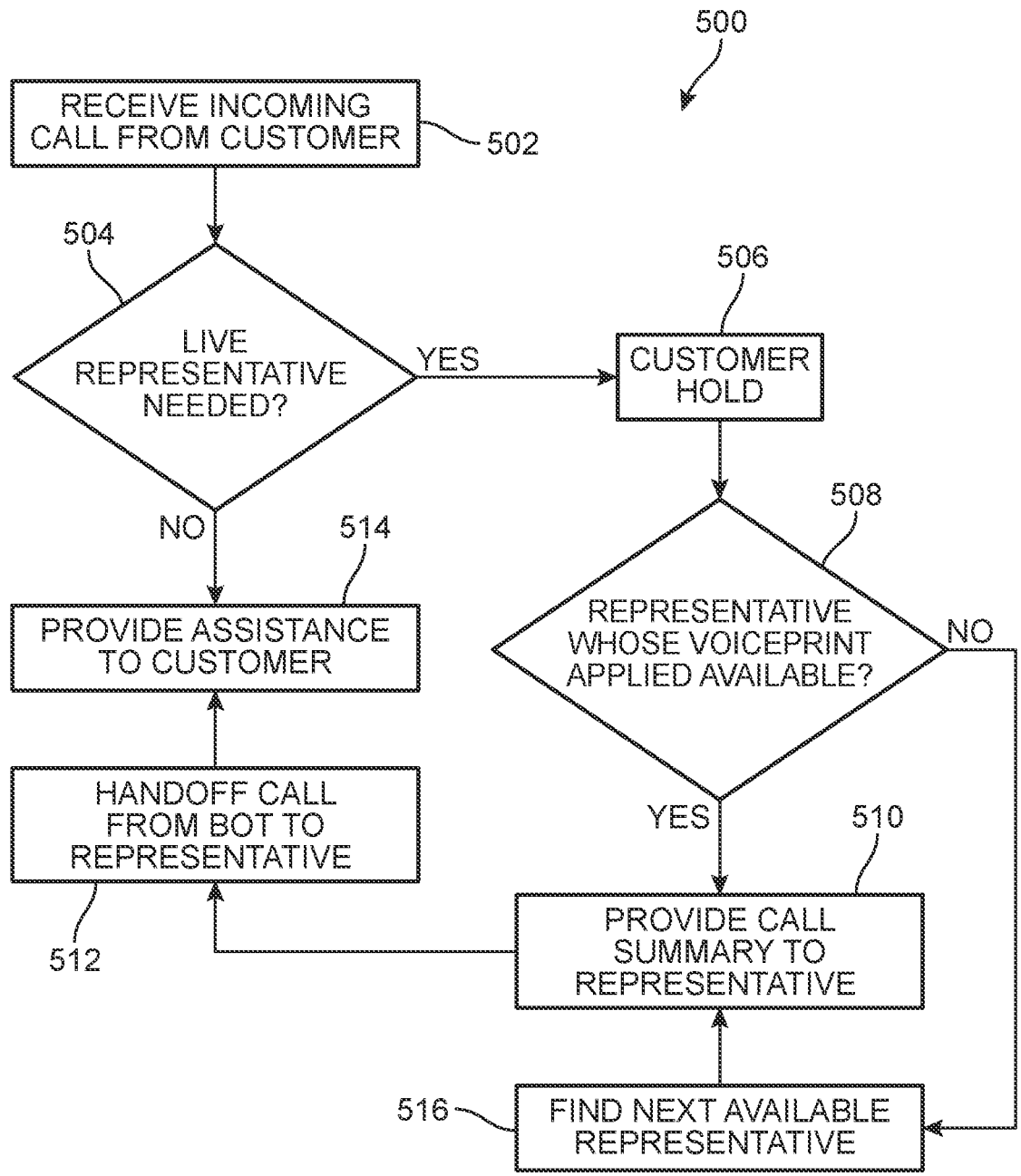
FIG. 5 is a flowchart of a method for handing off a customer from an automated bot using a generative voice to a customer service representative, according to an example embodiment.

Referring now to FIG. 5, an example embodiment of a method 500 for handing off a customer from an automated bot using a generative voice to a customer service representative is shown. In some embodiments, method 500 may be implemented by at least one processor associated with a call center, for example, a processor of computer system 112 of call center 100, shown in FIG. 1. In an example embodiment, method 500 may begin at an operation 502 where an incoming call from a customer is received at the call center. For example, operation 502 may include user 102 calling call center 100 over network 106, as shown in FIG. 4 above.

Next, method 500 may proceed to an operation 504. In an example embodiment, after operation 502 and prior to operation 504, a generative voice may be applied to the automated bot at the call center using a stored voiceprint of a representative, for example, from plurality of stored voiceprints 200, described above. At operation 504, whether or not a live representative is needed is determined. Upon determining at operation 504 that a live representative is needed (i.e., the result at operation 504 is "YES"), then method 500 may proceed to an operation 506. At operation 506, the customer is put on a brief hold to attempt to connect the call to an available customer service representative.

After the customer is put on hold at operation 506, method 500 proceeds to an operation 508. At operation 508 whether the representative whose voiceprint has been applied to the automated bot is available is determined. For example, as shown in FIG. 4, generative voice 402 of automated bot 113 is associated with second representative 214, at operation 508, whether or not second representative 214 is available to handle the incoming call with the customer is determined. Upon determining that the representative is available (i.e., the result at operation 508 is "YES"), then method 500 proceeds to an operation 510. At operation 510, a call summary of the interactions between the automated bot and the customer, as well as any other additional information, such as the customer's name, account information, etc., is provided to the representative.

Next, method 500 may proceed to an operation 512. At operation 512, the call is handed off from the automated bot to the customer service representative. For example, at operation 512, the call from user 102 that was initially handled by automated bot 113 using generative voice 402 is handed off from automated bot 113 to second representative 214, as shown in FIG. 4. Method 500 may then proceed to an operation 514 where the requested assistance is provided to the customer.

Referring back to operation 508, upon determining that the representative whose voiceprint has been applied to the automated bot is not available (i.e., the result at operation 508 is "NO"), then method 500 instead proceeds to an operation 516. For example, in some cases a representative may be delayed on an existing call with another customer, may be on a break, or may not be on duty. In these circumstances when the representative whose voiceprint has been applied to the automated bot is not available, operation 516 instead finds the next available representative to provide assistance to the customer.

Referring back to operation 504, upon determining that a live representative is not needed (i.e., the result at operation 504 is "NO"), then method 500 may proceed directly to operation 514 where the requested assistance is provided to the customer. For example, in some cases automated bot 113 may be capable of handling a customer's request or issue without requiring intervention or assistance by a live customer service representative. In these circumstances, a customer may interact with automated bot 113 using generative voice 402 to receive assistance without realizing that they have been talking to a bot. That is, the customer has a successful customer service experience interacting with automated bot 113 using generative voice 402 to imitate or mimic the voice of a real customer service representative (e.g., second representative 214 in these examples).

Figure 6:
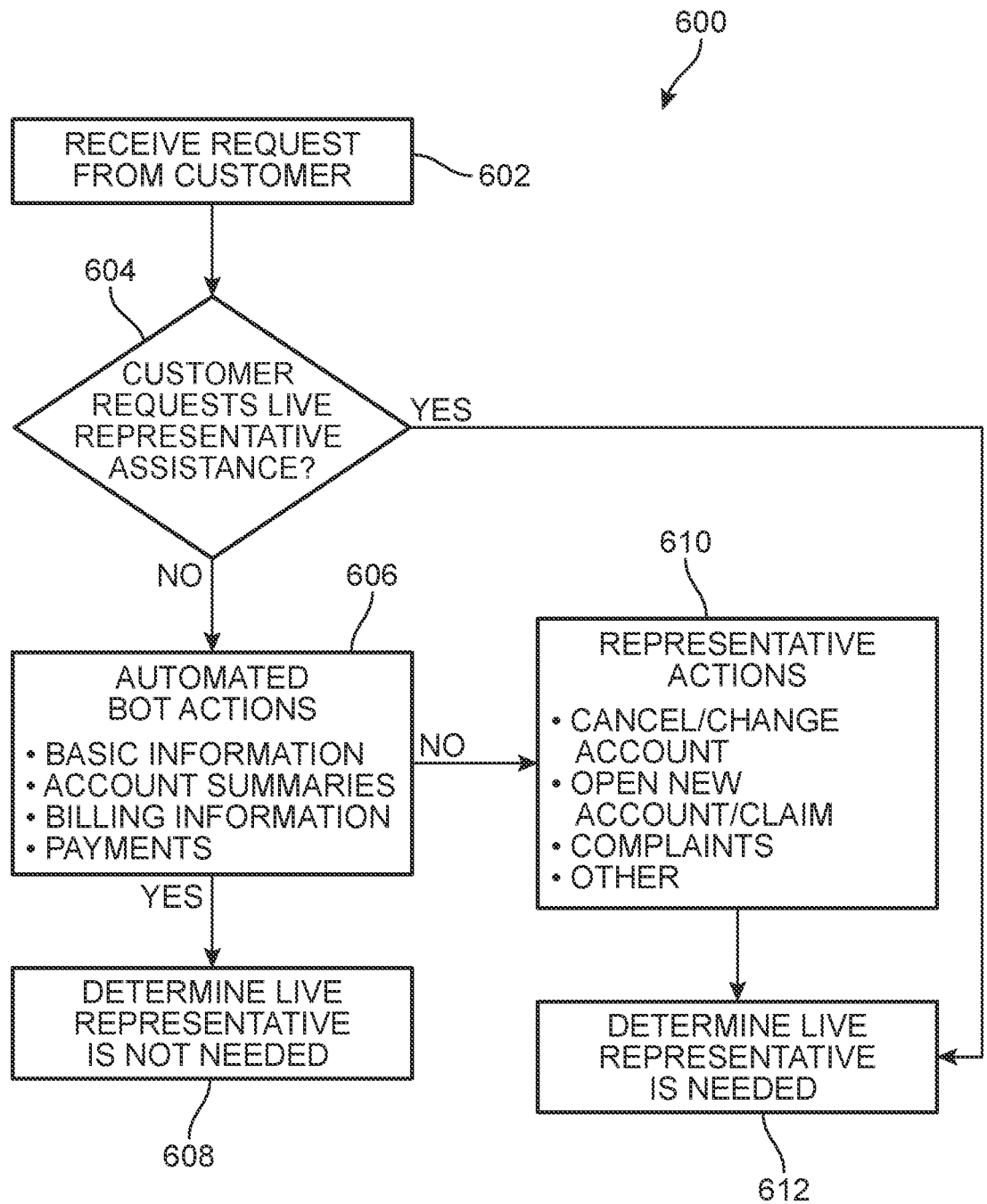
FIG. 6 is a flowchart of a method of determining whether a customer needs a live customer service representative, according to an example embodiment.

FIG. 6 is a flowchart of a method 600 of determining whether a customer needs a live customer service representative, according to an example embodiment. For example, method 600 may be used as part of operation 504 of method 500, described above, to determine whether or not a live representative is needed. In some embodiments, method 600 may be implemented by at least one processor associated with a call center, for example, a processor of computer system 112 of call center 100, shown in FIG. 1. In an example embodiment, method 600 may begin at an operation 602 where a request from a customer is received by the automated bot at the call center. For example, operation 602 may include user 102 requesting assistance from automated bot 113 using generative voice 402, as shown in FIG. 4.

Next, method 600 may proceed to an operation 604. At operation 604, whether the customer requests assistance from a live representative is determined. For example, in some cases, a customer may become frustrated interacting with an automated menu or bot and may request a live person for assistance. In other cases, a customer may make other requests that indicate a live representative is desired, such as asking for a supervisor or manager or indicating that they do not know the answer to a question. Upon determining at operation 604 that the customer has requested or indicated assistance by a live representative (i.e., the result at operation 604 is "YES"), then method 600 may proceed directly to an operation 612 where it is determined that a live representative is needed to handle the customer's request or issue. For example, the result of method 600 at operation 612 may be provided as the result of operation 504 of method 500, described above.

Upon determining at operation 604, however, that the customer has not requested or indicated assistance by a live representative (i.e., the result at operation 604 is "NO"), then method 600 may proceed to an operation 606. At operation 606, one or more actions that may be taken by the automated bot (e.g., automated bot 113) are compared with the customer's request. In some embodiments, an automated bot may be configured to handle several different types or categories of requests or issues. For example, at operation 606, some of the possible automated bot actions, include, but are not limited to: providing basic information to the customer (e.g., account numbers, addresses on file, products or services associated with the customer, etc.), account summaries, billing information, payments, or other categories of assistance that may be automated by the service provider. Upon determining at operation 606 that the customer's request falls into one of these categories (i.e., the result at operation 606 is "YES"), then method 600 proceeds to an operation 608. At operation 608 it is determined that a live representative is not needed to handle the customer's request or issue. For example, the result of method 600 at operation 608 may be provided as the result of operation 504 of method 500, described above. That is, the automated bot may fully provide the requested assistance to the customer.

Upon determining at operation 606, that the customer's request does not fall into one of these categories (i.e., the result at operation 606 is "NO"), then method 600 proceeds to an operation 610. At operation 610, one or more actions that may be taken by a live representative are compared with the customer's request. For example, in some cases, a live representative may be able to handle requests from customers to cancel or change accounts, open a new account or claim, make a complaint, or other action that a representative has authority to take to assist a customer. Upon determining at operation 610 that the customer's request may be handled by the live representative, then method 600 proceeds to operation 612 where it is determined that a live representative is needed to handle the customer's request or issue, as described above. In some cases, a customer's request may not fall into the actions authorized for either an automated bot (e.g., at operation 606) or a live representative (e.g., at operation 610). In these circumstances, more information may be needed from the customer to determine the assistance that is needed or a supervisor or manager may be needed to provide the appropriate level of assistance to the customer.

In some embodiments, a representative may experience a temporary change in the sound of their voice, for example, due to a cold, allergy, or other condition. In these embodiments, the stored voiceprint associated with the representative may not accurately imitate or mimic the temporarily altered voice of the representative. According to an alternate embodiment, a filter may be applied to the generative voice used by the automated bot to temporarily change the sound of the representative's voice as embodied in the stored voiceprint to more accurately imitate or mimic the current voice of the representative.

Figure 7:
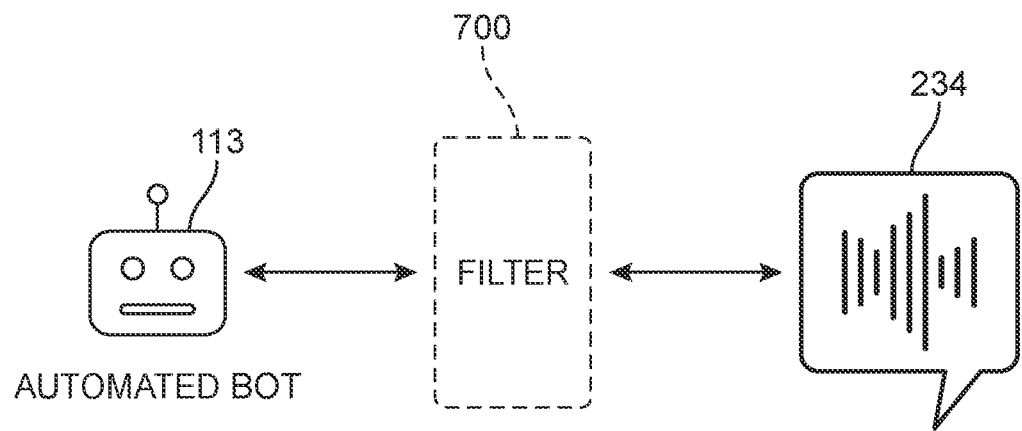
FIG. 7 is a schematic view of a process of using a voice filter on a generative voice applied by an automated bot, according to an example embodiment.

Referring now to FIG. 7, an alternate embodiment of a process of using a voice filter on a generative voice applied by an automated bot is shown. In this embodiment, automated bot 113 applies a generative that imitates or mimics second voiceprint 234 of second representative 214 as embodied in stored second stored voiceprint 204 of plurality of stored voiceprints 200. In this scenario, however, second representative 214 may be experiencing a cold or other temporary condition that causes a change in the sound of her voice. According to the techniques described herein, a filter 700 may be applied to the generative voice used by automated bot 113 to more accurately reflect the current (temporary) change in second voiceprint 234 of second representative 214. For example, in some embodiments, a representative may read a script to initialize their voiceprint on a daily basis or some other predetermined time period so that the system may determine whether or not the representative's voice has substantially changed due to a temporary condition. In these circumstances, filter 700 may be applied to the generative voice used by automated bot 113 to reflect these changes.

In other embodiments, filter 700 may be applied to the generative voice used by automated bot 113 for other purposes. In one embodiment, filter 700 may be a dynamic filter that is configured to alter the generative voice used by automated bot 113 during the call with the customer. For example, in cases where the likely representative that may be available to help the customer is unknown or cannot be determined, automated bot 113 may use a generic generative voice associated with a male voice or a female voice. In these cases, filter 700 may dynamically change the sound of the generic male/female generative voice used by automated bot 113 during the call with the customer to transition the generative voice to a voice associated with a specific representative. For example, starting at a predetermined time from a likely handoff from automated bot 113 to a specific representative (e.g. approximately 15-30 seconds), filter 700 may begin to dynamically alter the generic generative voice to transition to the voice of the specific representative so that once the call is handed off from automated bot 113 to the specific representative, the caller will not notice a change in the voice they hear on the call.

In other embodiments, filter 700 may be used in a similar manner to transition from one generative voice to a second generative voice. For example, in some cases, a first likely representative (e.g., second representative 214) may initially be determined to be the representative that would handle a call from a caller. In this case, automated bot 113 will apply a generative voice associated with the stored voiceprint for that representative (i.e., second stored voiceprint 204 associated with second representative 214). However, when the likely representative is not available when the time comes to handoff the customer from automated bot 113, the system may instead determine that a different representative will actually be assisting the customer. In this scenario, filter 700 may be used to transition the generative voice used by automated bot 113 from second stored voiceprint 204 associated with second representative 214 to a second generative voice associated with the voiceprint of the different representative (e.g., third stored voiceprint 206 associated with third representative 216). With this arrangement, the customer may not notice the difference in the voice they hear on the call.

In still other embodiments, filter 700 may be used to apply emotional characteristics to the generative voice used by automated bot 113. For example, based on context from the customer's request or voice, filter 700 may apply an emotional characteristic, such as empathy in the case of customers calling for help with a loss or calm in the case of customers who are angry or upset. With this arrangement, filter 700 may be used to modify the generative voice of automated bot 113 to better mimic or imitate the manner of speaking of a live representative when assisting customers.

Figure 8:
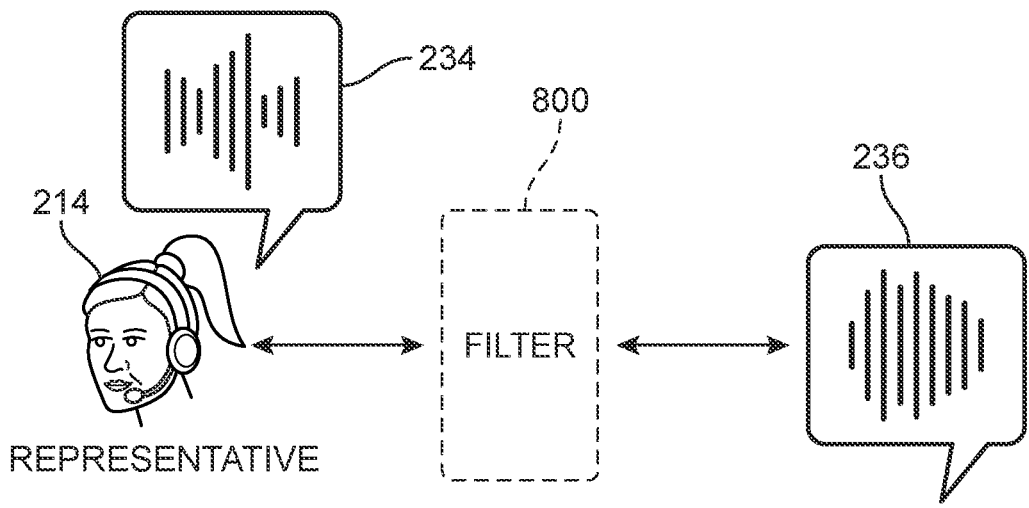
FIG. 8 is a schematic view of a process of using a voice filter on a live voice of a customer service representative, according to an example embodiment.

In some embodiments, a similar filter may also be used to change characteristics of the voice of a live representative on a call with a customer. Referring now to FIG. 8, an alternate embodiment of a process of using a voice filter on a live voice of a customer service representative is shown. In this embodiment, a voice filter 800 is applied to the voice of second representative 214 to change her voice from second voiceprint 234 to mimic or imitate third voiceprint 236, which is associated with a different representative (e.g., third representative 216). For example, voice filter 800 may be used in this manner when third representative 216 is not available so that there is a seamless handoff between the automated bot and the representative.

In other embodiments, voice filter 800 may be applied to the live (i.e., real-time) voice of representatives for other reasons. For example, in some cases, voice filter 800 may be used to adjust or modify the voice of a representative to more closely resemble a voice that has been determined to be soothing or well-received according to a test group or customer feedback. In other cases, voice filter 800 may be used to apply a custom voice avatar to the customer's interactions with a call center. For example, in these cases, the customer may select, for example, through a profile or other setting, a customized voice avatar that is applied to both a generative voice used by an automated bot and to the live voice of a representative when the customer calls the call center. This customized voice avatar may be a celebrity voice, a cartoon voice, or any preselected or customized voice, which may be saved in database 116 at call center 100 and is applied when the customer calls.

In still other embodiments, voice filter 700 may be applied to the generative voice of the automated bot (e.g., automated bot 113) and/or voice filter 800 may be applied to the live (i.e., real-time) voice of representatives to alter characteristics associated with a language or accent, an ethnicity, or gender of the automated bot or representative. For example, a customer may feel more at ease and have an improved experience when interacting with a voice that shares at least one similarity with the language/accent, ethnicity, or gender of the customer. In these embodiments, one or more of a customer's language/accent, ethnicity, or gender may be determined based on the customer's video or audio call to the call center. This determined information may then be used to apply a dynamically generated voice filter (e.g., voice filter 700 and/or voice filter 800) to the voice heard by the customer to match at least one similarity with the language/accent, ethnicity, or gender of the customer.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary methods and/or processes described above including multiple operations, it may be understood that other embodiments some operations may be omitted and/or reordered. In some other embodiments, additional operations could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of applying a generative voice to an automated bot at a call center, the method comprising:
    receiving an incoming call from a customer at the call center;
    applying a first generative voice to the automated bot using a stored voiceprint of a first customer service representative from a plurality of stored voiceprints;
    interacting with the customer, by the automated bot, using the first generative voice so as to mimic a voice of the first customer service representative; and
    prior to handing off the call to a live customer service representative, applying a filter to the first generative voice used by the automated bot to dynamically change the first generative voice during the call to transition from the first generative voice to a second generative voice.

2. The method according to claim 1, further comprising:
    determining that the customer needs assistance from a live customer service representative; and
    handing off the call from the automated bot to the live customer service representative.

3. The method according to claim 2, wherein the live customer service representative is a second customer service representative that is different from the first customer service representative whose stored voiceprint has been applied to the automated bot as the first generative voice.

4. The method according to claim 2, wherein the handoff from the automated bot to the live customer service representative is seamless so that the second generative voice of the automated bot sounds substantially identical to a voice of the live customer service representative.

5. The method according to claim 1, wherein the plurality of stored voiceprints includes at least one stored voiceprint associated with each customer service representative of a plurality of customer service representatives associated with the call center.

6. The method according to claim 1, further comprising using the filter on one of the first generative voice or the second generative voice applied by the automated bot to change at least one characteristic of the first generative voice or the second generative voice.

7. The method according to claim 6, wherein the filter is used to apply at least one emotional characteristic to the first generative voice or the second generative voice.

8. The method according to claim 6, further comprising:
    determining a temporary change to the voice of the first customer service representative; and
    wherein the filter dynamically changes the first generative voice during the call to transition to the second generative voice to reflect the temporary change to the voice of the first customer service representative.

9. The method according to claim 1, further comprising:
    applying the filter to transition from the first generative voice to the second generative voice at a predetermined amount of time before the handoff from the automated bot to the live customer service representative.

10. A system for applying a generative voice to an automated bot at a call center, comprising:
    a computer system at a call center, the computer system including at least one processor associated with a computing device and at least one database;
    the call center in communication with one or more customers through a network;
    wherein the at least one processor is configured to:
        receive an incoming call from a customer at the call center;
        apply a first generative voice to the automated bot using a stored voiceprint of a first customer service representative from a plurality of stored voiceprints;
        interact with the customer, by the automated bot, using the first generative voice so as to mimic a voice of the first customer service representative; and
        prior to handing off the call to a live customer service representative, apply a filter to the first generative voice used by the automated bot to dynamically change the first generative voice during the call to transition from the first generative voice to a second generative voice.

11. The system according to claim 10, wherein the at least one processor is further configured to:
    determine that the customer needs assistance from a live customer service representative; and
    handoff the call from the automated bot to the live customer service representative.

12. The system according to claim 11, wherein the live customer service representative is a second customer service representative that is different from the first service representative whose stored voiceprint has been applied to the automated bot as the first generative voice.

13. The system according to claim 11, wherein the handoff from the automated bot to the live customer service representative is seamless so that the second generative voice of the automated bot sounds substantially identical to a voice of the live customer service representative.

14. The system according to claim 10, wherein the plurality of stored voiceprints includes at least one stored voiceprint associated with each customer service representative of a plurality of customer service representatives associated with the call center.

15. The system according to claim 10, wherein the at least one processor is further configured to use the filter on one of the first generative voice or the second generative voice applied by the automated bot to change at least one characteristic of the first generative voice or the second generative voice.

16. The system according to claim 15, wherein the filter is used to apply at least one emotional characteristic to the first generative voice or the second generative voice.

17. The system according to claim 15, wherein the at least one processor is further configured to:
    determine a temporary change to the voice of the first customer service representative; and
    use the filter to dynamically change the first generative voice during the call to transition to the second generative voice to reflect the temporary change to the voice of the first customer service representative.

18. The system according to claim 10, wherein the at least one processor is further configured to:
  apply the filter to transition from the first generative voice to the second generative voice at a predetermined amount of time before the handoff from the automated bot to the live customer service representative.

19. A method of eliminating a voice discontinuity during a handoff from an automated bot to a customer service representative at a call center, the method comprising:
  receiving an incoming call at the call center from a customer;
  determining a first customer service representative likely to be available to assist the customer;
  applying a first generative voice to an automated bot that initially interacts with the customer, wherein the first generative voice is applied using a stored voiceprint of the first customer service representative from a plurality of stored voiceprints;
  interacting with the customer, by the automated bot, using the first generative voice of the first customer service representative;
  determining that a live customer service representative is needed to assist the customer;
  determining that the first customer service representative whose stored voiceprint was used for the first generative voice of the automated bot is not available;
  applying a filter to the first generative voice used by the automated bot to dynamically change the first generative voice during the call to transition from the first generative voice to a second generative voice associated with a second customer service representative; and
  handing off the call from the automated bot to the second customer service representative.

20. The method according to claim 19, further comprising using the filter on one of the first generative voice or the second generative voice applied by the automated bot to change at least one characteristic of the first generative voice or the second generative voice.

* * * * *